US 6,663,071 B2

(12) United States Patent
Peterson

(10) Patent No.: US 6,663,071 B2
(45) Date of Patent: Dec. 16, 2003

(54) TELESCOPING MULTIPOD SUPPORT APPARATUS

(76) Inventor: Thomas K. M. Peterson, 1815 N. Spring St., New Ulm, MN (US) 56073

( * ) Notice: Subject to any disclaimer, the term of this patent is extended or adjusted under 35 U.S.C. 154(b) by 0 days.

(21) Appl. No.: 09/941,506

(22) Filed: Aug. 28, 2001

(65) Prior Publication Data

US 2003/0042388 A1 Mar. 6, 2003

(51) Int. Cl.⁷ ............................................. F16M 11/32
(52) U.S. Cl. ........................ 248/440.1; 42/94; 248/128.8
(58) Field of Search ............................ 248/440.1, 168, 248/125.8, 163.1, 188; 42/94

(56) References Cited

U.S. PATENT DOCUMENTS

| D257,259 S | * | 10/1980 | Shiraishi | D16/244 |
| 4,397,112 A | * | 8/1983 | York | D22/108 |
| 4,676,021 A | * | 6/1987 | Groba | 42/94 |
| D346,636 S | * | 5/1994 | Bechtel | D16/244 |
| 5,311,693 A | * | 5/1994 | Underwood | 42/94 |
| 5,377,437 A | * | 1/1995 | Underwood | 42/94 |
| D356,137 S | * | 3/1995 | Hull et al. | D22/108 |
| 5,406,732 A | * | 4/1995 | Peterson | 42/94 |
| D382,286 S | * | 8/1997 | Doran | 42/94 |
| D386,510 S | | 11/1997 | Peterson | |
| 5,711,103 A | * | 1/1998 | Keng | D22/108 |
| D390,301 S | | 2/1998 | Peterson | |
| 6,027,087 A | * | 2/2000 | Lindemann et al. | 248/164 |
| 6,059,697 A | * | 5/2000 | Breems | 224/908 |

* cited by examiner

Primary Examiner—Ramon O. Ramirez
(74) Attorney, Agent, or Firm—Roger W. Jensen

(57) ABSTRACT

A multipod apparatus having either a bipod mode of use or pair-of-monopods mode of use comprising a head member having a pair of brackets having a central portion, a monopod-dedicated leg portion, and a support leg portion. The brackets are pivotally connected together with central portions being abutted in side-by-side relationship for limited relative rotation. A pair of monopod members have at their top ends a longitudinally-extending threaded stud which may be screwed in to threaded bores in the monopod-dedicated leg portions of the brackets to provide a bipod apparatus. Alternatively, the monopod members may be individually and selectively disconnectable from the head member to provide monopod apparatus.

8 Claims, 3 Drawing Sheets

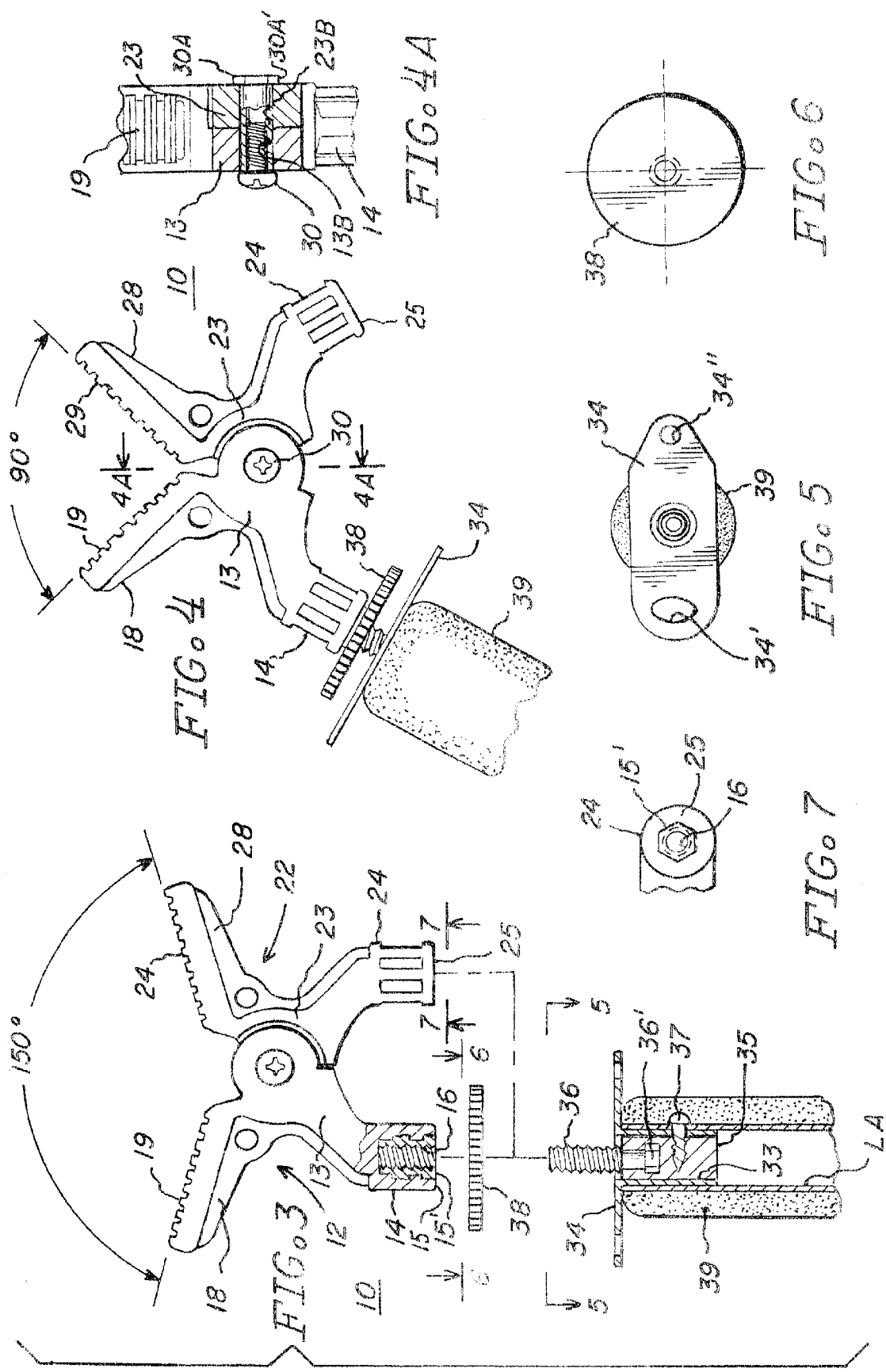

TELESCOPING MULTIPOD SUPPORT APPARATUS

BACKGROUND OF THE INVENTION AND DESCRIPTION OF PRIOR ART

The present invention is a telescoping multipod support apparatus having multiple uses, the adjective "multipod" being herein defined as an apparatus having both a bipod mode of use and, alternatively, a pair-of-monopods mode of use.

Bipod support apparatus, of course, are old in the art; one example being the Applicant's U.S. Des. Pat. Des. 390,301.

Likewise, monopod apparatus are old in the art, an example being the Applicant's prior U.S. Des. Pat. Des. 386,510.

Bipods and monopods, of course, have a plurality of uses; they may be used as a support means for guns, cameras, optical devices such as spotting scopes and binoculars, etc. In addition, monopods have great utility as walking aids, e.g., hiking staff, wading staff, etc.

The prior art bipods have been characterized by being permanently assembled, i.e., not capable of ready disassembly or future reassembly.

Thus the prior art bipods and monopods, while very useful, were limited to their inherent uses; this could impose a constraint on the user. If the user only had a monopod then of course the user had no bipod function. Conversely, if a user had only a bipod, then the user had no monopod function; a collapsed bipod not being a satisfactory walking staff. The present invention provides a solution to this problem.

SUMMARY OF THE INVENTION

The present invention provides a monopod apparatus having both a bipod mode of use and a pair-of-monopods mode of use. The present invention provides a multipod apparatus comprising a head member and a pair of monopod members which are selectively connectable and disconnectable to the head member. More specifically, the head member has a pair of substantially identical brackets, each having (i) a central portion; (ii) a monopod-dedicated leg portion connected to the central portion and having an end having a flat surface and a threaded bore; and (iii) a support leg portion connected to the central portion, the pair of brackets being pivotally connected together with said central portions being abutted together in side-by-side relationship for limited relative rotation.

Each of the pair of monopod members comprises a multisection longitudinally telescoping elongated staff member having top and bottom ends. The top end has a flat radially disposed surface and a longitudinally extending threaded stud. Each of the monopod members is selectively connected to the head member by the threaded studs being screwed into the threaded bores of the monopod-dedicated leg portions of said pair of brackets to thereby provide a bipod apparatus. Alternatively, the monopod members may be individually and selectively disconnectable from the head member to thereby provide monopod apparatus.

BRIEF DESCRIPTION OF THE DRAWINGS

FIGS. 2A, 2B, 2C, and 2D respectively show a bipod head member, a monopod head member, a walking staff knob, and a camera, all of which may be individually attached to the monopod by a threaded stud 36 on the top of the monopod being screwed into threaded bores of the aforesaid elements.

FIG. 3 shows an exploded view of bipod head member and the top portion of a monopod member.

FIG. 4 shows a bipod head member 10 assembled with one monopod member.

FIG. 4A is a cross section of the pivotal connection between brackets 13 and 23 of the head member 10 as viewed along section lines 4A—4A of FIG. 4.

FIG. 5 is a view of the top of the monopod member as viewed along lines 5—5 of FIG. 3.

FIG. 6 is a top view of the lock nut 38 as viewed along lines 6—6 of FIG. 3.

FIG. 7 is view of the threaded recess 16 centrally positioned in one of the monopod-dedicated leg portions of the head member 10 as viewed along lines 7—7 of FIG. 3.

DETAILED DESCRIPTION OF THE INVENTION

Figure 1:
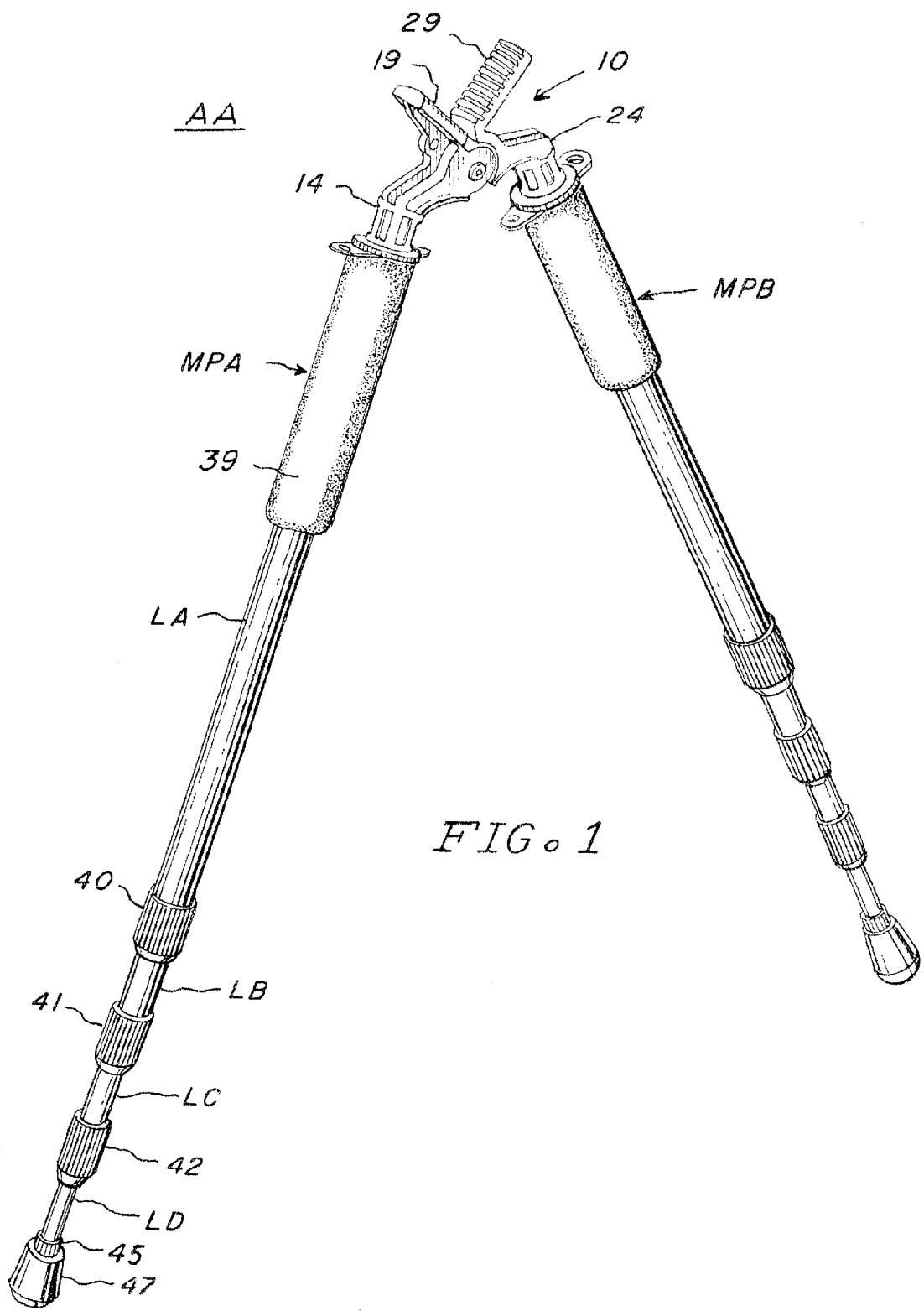
FIG. 1 is a left front perspective view of a telescoping multipod support apparatus, in open position.
Figure 2:
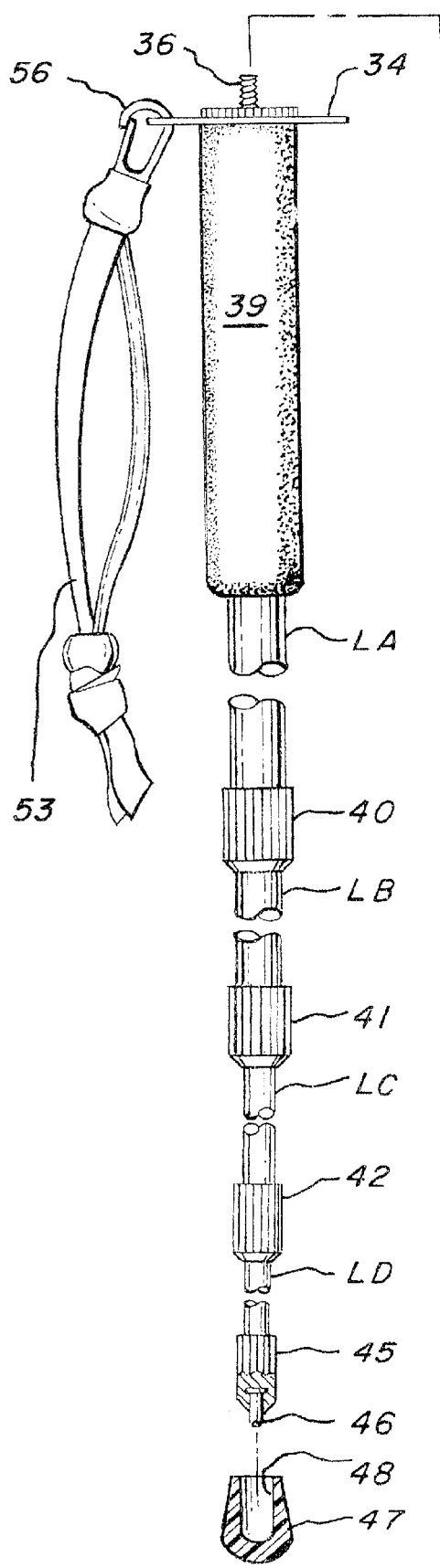
FIG. 2 is a front elevational view of one of the monopods.
Figure 2:
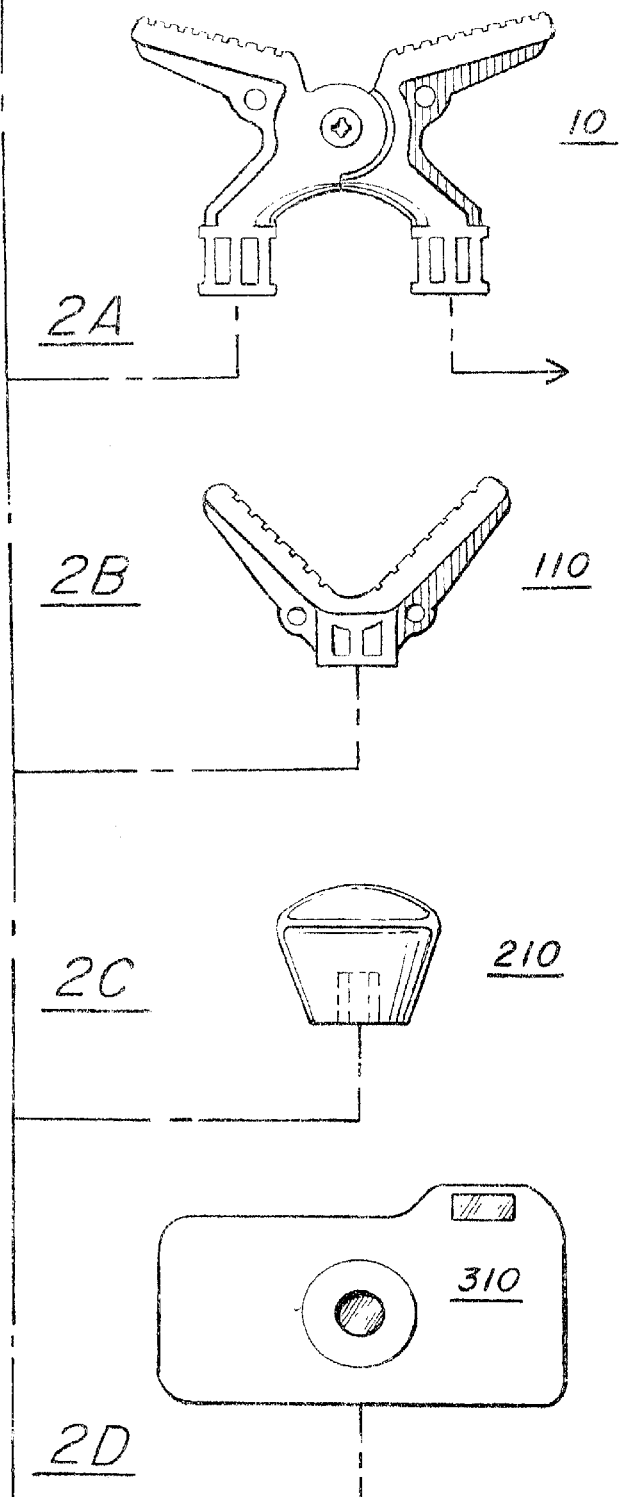

In FIG. 1, a multipod apparatus AA is depicted in a bipod mode of use. The apparatus comprises a head member 10 and a pair of monopod members MPA and MPB, both selectively attached to monopod-dedicated leg portions 14 and 24 of the head member, and also selectively detachable therefrom as will be described in greater detail below. Each of the monopod members is characterized by being a multisectioned longitudinally-telescoping elongated staff member having top and bottom ends. In the embodiment depicted in FIG. 1, the monopod member MPA has four telescoping sections LA, LB, LC, and LD, each of preselected length and preferably made from high-strength, lightweight anodized aluminum tubing. The longitudinal length of the monopod is selectively controlled by adjustment of the couplings 40, 41, and 42. Couplings 40, 41 and 42 may be of the POSI-LOCK type of coupling available from Stoney Point Products, Inc. of New Ulm, Minn. The bottom of the monopod MPA is best shown in FIG. 2, comprising a cylindrical end piece 45 having a preselected diameter, supporting at the very bottom end thereof a carbide steel tip 46; in this configuration the monopod may be used as a walking stick where a sharp, pointed staff is desired. Alternatively, the member 45 may be encompassed by a cup-like tip 47 having a recess 48 adapted to slide over the outer periphery of member 45. Tip 47 is preferably made from hard rubber.

The top end of the monopod MPA is best shown in FIG. 3, where the tube member LA is shown encompassed by a comfort foam grip means 39. The monopod member has at the top end a flat radially-disposed surface 34, i.e., the top surface of a flange-like extension of a tubular insert 33 which fits snugly within the inner bore of tube LA. A threaded stud 36 having a hex head 36' embedded in a cylindrical plastic plug 35 is centrally positioned within the member 33. Plug 35 is held with respect to tube LA by a screw 37. The threaded stud 36 projects longitudinally or axially above the top of the flat surface 34 as is clearly shown in FIG. 3.

The head member 10 has a pair of brackets 12 and 22 as shown in FIG. 3, each of the brackets respectively having a central portion 13 and 23, and monopod-dedicated leg portions 14 and 24 being connected to their respective central portions and having ends 15 and 25, respectively, with flat surfaces and centrally located threaded bores normal to flat surfaces 15 and 25. For example, the monopod-dedicated leg portion 14 is shown in FIG. 3 to have a flat surface 15 at the bottom end thereof, and with a threaded bore 16.

The head member brackets 12 and 22 further comprise, respectively, support leg portions 18 and 28, which are connected to the central portions, and each of which has on the upper or top surface thereof appropriate surfaces 19 and 24 for safely supporting some apparatus such as a gun or binoculars (not shown).

The brackets 12 and 22 are adapted to be pivotally connected together with the central portions 13 and 23 being abutted together in side-by-side relationship for limited relative rotation, as is shown best in FIG. 4A. Central portions 13 and 23 have bores 13B and 23B, respectively, which, upon assembly, are in axial alignment; the pivot is being provided by a tubular nut 30A which fits within the aligned bores 13B and 23B and has an internal threaded bore and a hex head 30A'. A machine screw 30 is then threaded into the threaded bore of the nut 30A and is screwed in to provide the desired amount of frictional connection between the central portions 13 and 23 of the head.

Each of the monopod members MPA and MPB are selectively connected to the head member 10 by the monopod threaded studs 36 being screwed into the threaded bores 16 in the monopod-dedicated leg portions. A lock nut 38, shown both in FIG. 3 and in FIG. 6, provides a means for locking the stud 36 at any desired point within the threaded bore 16 as is depicted in FIG. 4.

The head 10 is shown in FIG. 3 with the flat surfaces 15 and 25 of the monopod-dedicated leg portions 14 and 24 substantially coplanar and transversely spaced apart a preselected distance when the pair of brackets are in a first preselected angular relationship as shown in FIG. 3. In this position, the jaws or top surfaces 19 and 24 of the brackets are rotationally spaced apart a maximum amount, depicted in FIG. 3 as 150 degrees. For this configuration, the head 10 may be used for supporting objects such as a camera or binoculars, or other apparatus such as a firearm. When the legs 14 and 24 of the head 10 are opened as is shown in FIGS. 1 and 4, then the angle defined by surfaces 19 and 29 is significantly reduced, the angle depicted in FIG. 4 being 90 degrees.

Referring to FIGS. 2, and 2A–2D, the threaded stud 36 may be attached to one side of a bipod head 10, a monopod head 110, a hiking staff 210, or a camera 310.

The flange portion 34 of tubular insert 33 has an elongated shape shown best in FIG. 5 with holes or apertures 34' and 34" in opposite ends thereof. A wrist or carrying strap 53 shown in FIG. 2 may be attached via a clip 56 through the hole 34' when the MPA and/or MPB are used either as individual hiking staffs or monopods, or when used jointly as a bipod.

While the preferred embodiment of the invention has been illustrated, it will be understood that variations may be made by those skilled in the art without departing from the inventive concept. Accordingly, the invention is to be limited only by the scope of the following claims.

I claim:

1. A multipod apparatus having a bipod mode of use and a pair-of-monopods mode of use, said multipod apparatus comprising:

a. a head member having a pair of brackets each having (i) a central portion, (ii) a monopod-dedicated leg portion connected to said central portion and having an end having a flat surface and a threaded bore, and (iii) a support leg portion connected to said central portion, said pair of brackets being pivotally connected together with said central portions being abutted together in side by side relationship for limited relative rotation; and b. a pair of monopod members each of which comprises a multi-sectioned, longitudinally telescoping elongated staff member having top and bottom ends, said top end having a flat radially disposed surface and a longitudinally extending threaded stud;

said pair of monopod members being selectively connected to said head member by said monopod threaded studs being screwed into said threaded bores of said monopod dedicated leg portions of said pair of brackets to thereby provide a bipod apparatus, and said monopod members being individually and selectively disconnectable from said head member to thereby provide monopod apparatus.

2. The apparatus of claim 1, wherein said flat end surfaces of said monopod-dedicated leg portions are substantially coplanar and are transversely spaced apart a preselected distance when said pair of brackets are in a first preselected angular relationship.

3. The apparatus of claim 2, further characterized by (i)each of said central portions of said brackets having bores, and pivot means positioned in said bores, (ii) said threaded bores of said monopod dedicated leg portions are centrally positioned with respect to said flat surfaces on the ends of said monopod dedicated leg portions, and (iii) said threaded studs of said monopod members are centrally positioned with respect to said flat radially-disposed surfaces on said top ends of said staff members.

4. The apparatus of claim 3, further characterized by having cushion-type grips adjacent to said top ends of said staff members.

5. The apparatus of claim 1, wherein each of said central portions of said brackets have bores extending therethrough and pivot means positioned in said bores to provide a pivotal connection for said brackets.

6. The apparatus of claim 1, wherein said threaded bores of said monopod-dedicated leg portions are centrally positioned with respect to said flat surfaces on the ends of said monopod dedicated leg portions.

7. The apparatus of claim 6, wherein said threaded studs of said monopod members are centrally positioned with respect to said flat radially-disposed surfaces on said top ends of said staff members.

8. The apparatus of claim 7, further characterized by including a locknut on each of said threaded studs.

* * * * *